United States Patent
Seler et al.

(10) Patent No.: US 10,921,443 B2
(45) Date of Patent: Feb. 16, 2021

(54) AUTOMOTIVE RADAR SYSTEM AND METHOD OF SYNCHRONISING AN AUTOMOTIVE RADAR SYSTEM

(71) Applicant: NXP B.V., Eindhoven (NL)

(72) Inventors: Ernst Seler, Munich (DE); Gustavo Adolfo Guarin Aristizabal, Munich (DE)

(73) Assignee: NXP B.V., Eindhoven (NL)

( * ) Notice: Subject to any disclaimer, the term of this patent is extended or adjusted under 35 U.S.C. 154(b) by 225 days.

(21) Appl. No.: 16/015,726

(22) Filed: Jun. 22, 2018

(65) Prior Publication Data

US 2018/0372865 A1    Dec. 27, 2018

(30) Foreign Application Priority Data

Jun. 23, 2017  (EP) ..................... 17177605

(51) Int. Cl.
| | | |
|---|---|---|
| *G01S 13/931* | (2020.01) | |
| *G01S 13/87* | (2006.01) | |
| *G01S 7/03* | (2006.01) | |
| *G01S 7/00* | (2006.01) | |

(52) U.S. Cl.
CPC ............ *G01S 13/931* (2013.01); *G01S 7/003* (2013.01); *G01S 7/032* (2013.01); *G01S 13/87* (2013.01)

(58) Field of Classification Search
CPC ........ G01S 7/003; G01S 13/931; G01S 13/87; G01S 7/00; G01S 7/03; G01S 7/93; G01S 7/352; G01S 13/872; G01S 7/032
USPC ........................................................ 342/70
See application file for complete search history.

(56) References Cited

U.S. PATENT DOCUMENTS

| | | | | |
|---|---|---|---|---|
| 5,353,033 A | * | 10/1994 | Newberg ............... | G01S 13/42 342/375 |
| 5,353,285 A | * | 10/1994 | Van Der Plas ....... | H04J 3/1694 370/443 |
| 6,069,581 A | * | 5/2000 | Bell ........................ | G01S 13/18 342/70 |
| 6,380,883 B1 | * | 4/2002 | Bell ..................... | B60Q 1/0023 342/70 |
| 10,061,016 B2 | * | 8/2018 | Ginsburg ............... | G01S 7/352 |
| 2010/0097263 A1 | * | 4/2010 | Vacanti ................. | G01S 13/343 342/70 |

(Continued)

OTHER PUBLICATIONS

Jau-Jr Lin, "Integration of Multiple Automotive Radar Modules Based on Fiber-Wireless Network", in 2015 24th Wireless and Optical Communication Conference (WOCC) Proceedings IEEE 2015. (Year: 2015).*

(Continued)

*Primary Examiner* — Vladimir Magloire
*Assistant Examiner* — Alexander L. Syrkin

(57) ABSTRACT

An automotive radar system comprises: a master module, a first radar module, a second radar module, and an optical waveguide arrangement operably coupling the master module to the first and second radar modules. The master module comprises an electro-optical interface device having an electrical domain side and an optical domain side. The optical domain side is operably coupled to the optical waveguide arrangement. The master module comprises a digital clock signal generator operably coupled to the electrical domain side of the electro-optical interface device.

20 Claims, 7 Drawing Sheets

(56) References Cited

U.S. PATENT DOCUMENTS

2014/0161385 A1\* 6/2014 Lessard .................. G02B 6/122
 385/14
2015/0153445 A1\* 6/2015 Jansen .................... G01S 7/032
 701/93

OTHER PUBLICATIONS

Lin, J., "Integration of Multiple Automotive Radar Modules Based on Fiber-Wireless Network", 24th Wireless and Optical Communication Conference (WOCC), 2015.

Mandlik, M., "An Accuracy Synchronization Method for Passive Radar System", 978-1-4799-3715-8/14, IEEE 2014.

\* cited by examiner

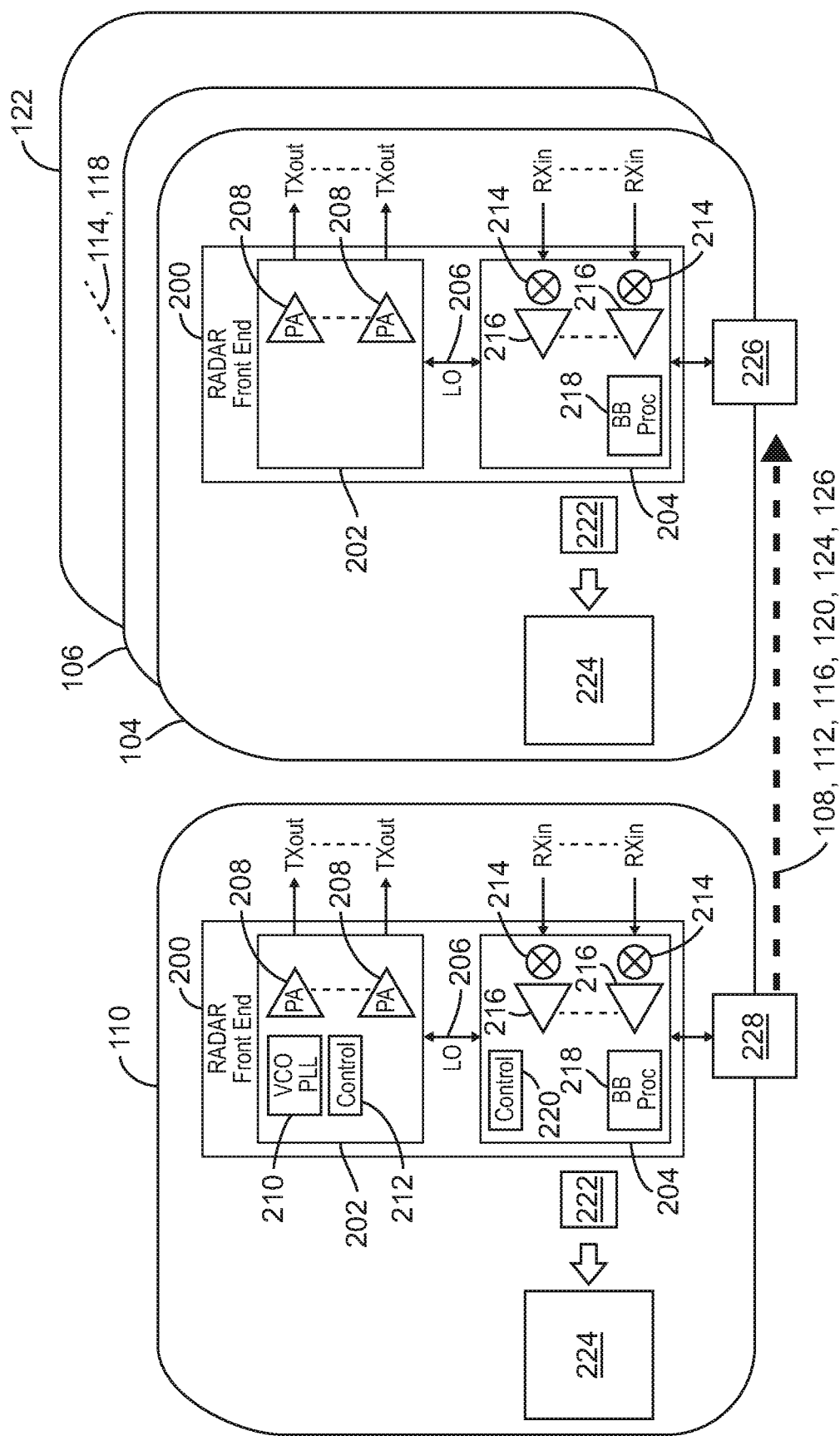

AUTOMOTIVE RADAR SYSTEM AND METHOD OF SYNCHRONISING AN AUTOMOTIVE RADAR SYSTEM

CROSS-REFERENCE TO RELATED APPLICATIONS

This application claims the priority under 35 U.S.C. § 119 of European Patent application no. 17177605.7, filed on 23 Jun. 2017, the contents of which are incorporated by reference herein.

DESCRIPTION

Field of the Invention

The field of the invention relates to an automotive radar system of the type that, for example, illuminates an environment and processes reflected signals received. The field of the invention also relates to a method of synchronising an automotive radar system, the method being of the type that, for example, processes reflected signal data received at a radar module in respect of an illuminated environment.

BACKGROUND OF THE INVENTION

In the automotive industry, the Advanced Driver Assistance System (ADAS) is a system that provides functionality to alert and assist drivers, for example to avoid obstacles, particularly where collisions are possible. Some ADASs can relieve a driver of control of a vehicle in order to respond to dangerous situations. Known ADASs can employ radar, cameras, and/or data networks. Automotive radar is an important sensor technology used in ADASs. One of the most important parameters in automotive applications for radar systems is the resolution of scanning with respect to an environment being "illuminated" in order to detect obstacles.

In this regard, a vehicle can typically be equipped with multiple radar sensor modules to monitor the environment around the vehicle. If it were possible to synchronise individual radar sensor modules with each other, it would be possible to create a virtual antenna of considerable size with respect to the vehicle, where each individual radar sensor module could evaluate reflected electromagnetic waves emitted by other radar sensor modules disposed at different location on the vehicle. However, such synchronisation is currently not possible owing to limited performance of electromagnetic signals used to provide synchronisation between the radar sensor modules.

It is known to use optical fibres to provide synchronisation of receivers of a passive radar system, for example as described in "An accuracy Synchronisation Method for Passive Radar System" (Mandlik et al., IEEE Proceedings on Radioelektronika (RADIOELEKIRONIKA), 2014 24th International Conference, April 15-16). It is also known to use optical fibres to distribute Frequency Modulated Continuous Wave (FMCW) analogue radar signals from a central module to a number of radar modules, for example as described in "Integration of Multiple Automotive Radar Modules Based on Fiber-Wireless Network" (Lin, Jau-Jr, Proceedings of the 24th Wireless and Optical Communication Conference (WOCC), IEEE, 2015, pages 36-39). However, the use of these techniques does not enable the resolution required in current ADASs.

SUMMARY OF THE INVENTION

The present invention provides an automotive radar system and a method of synchronising an automotive radar system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 2 is a schematic diagram of the automotive radar system of FIG. 1 in greater detail;

DETAILED DESCRIPTION

Figure 1:
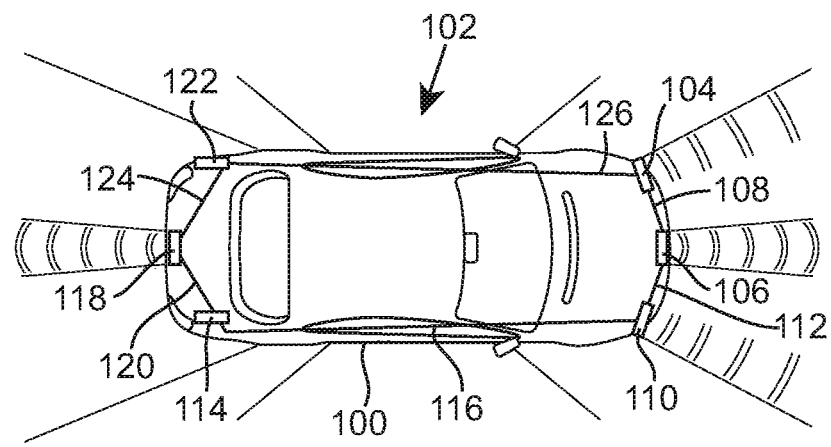
FIG. 1 is a schematic diagram of a vehicle comprising an automotive radar system constituting an embodiment of the invention.

Although examples of the invention are described with reference to optical fibres, it is envisaged that in other examples, the circuits and concepts herein described may be equally used with any suitable optical waveguide. Hence, it is envisaged that any reference to optical fibres hereafter encompasses all kinds of suitable optical waveguide.

Although examples of the invention are described with reference to a specific kind of radar module and/or electro-optic interface module, it is envisaged that, in other examples, alternative circuits can be applied to the automotive radar systems described herein.

Examples of a first aspect of the present invention provide an automotive radar system comprising an automotive radar system comprising: a master module; a first radar module; a second radar module; an optical waveguide arrangement operably coupling the master module to the first and second radar modules; wherein the master module comprises an electro-optical interface device having an electrical domain side and an optical domain side, the optical domain side being operably coupled to the optical waveguide arrangement; and the master module comprises a digital clock signal generator operably coupled to the electrical domain side of the electro-optical interface device.

The digital clock signal generator may be an analogue-to-digital converter clock signal generator.

The master module may comprise a local oscillator signal generator operably coupled to the electrical domain side of the electro-optical interface device.

The first radar module may comprise a first digital clock signal receiver. The second radar module may comprise a second digital clock signal receiver.

The master module may be arranged to communicate a digital clock signal, when in use, to the first radar module in order to maintain synchronism between the master module and the first radar module. The master module may be arranged to communicate the digital clock signal, when in use, to the second radar module, thereby maintaining synchronism between the master module, the first radar module and the second radar module. The master module may be arranged to generate an illumination signal. The master module may be arranged to cooperate with the first radar module in order to provide synchronism with respect to the illumination signal. The synchronism may be with respect to a trigger signal.

The master module may be a central unit. The master module may be arranged to generate a Frequency Modulated Continuous Wave (FMCW) chirp signal. The master module may be arranged to generate the illumination signal as a digitally modulated signal.

The first radar module may be arranged to communicate radar data to the master module. The second radar module may be arranged to communicate data back to master module.

The master module may be a third radar module.

The master module may be arranged to launch an optical digital clock signal, when in use, into the optical fibre arrangement.

The optical waveguide may be an optical fibre.

Examples of a second aspect of the present invention provide a method of synchronizing an automotive radar system, the method comprising: a master module generating an optical digital clock signal; and the master module launching the optical digital clock signal into an optical waveguide arrangement operably coupled to a first radar module and a second radar module, thereby communicating the optical digital clock signal to the first radar module and the second radar module.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Referring to FIG. 1, in a simplified example of a vehicle 100 comprising an automotive radar system 102, the system 102 comprising a first radar module 104 operably coupled to a second radar module 106 via a first optical fibre 108. The second radar module 106 is operably coupled to a third radar module 110 via a second optical fibre 112, the first, second and third radar modules 104, 106, 110 being disposed towards the front end of the vehicle 100. Towards the rear end of the vehicle, a fourth radar module 114 is operably coupled to the third radar module 110 via a third optical fibre 116, the fourth radar module 114 also being operably coupled to a fifth radar module 118 via a fourth optical fibre 120. The fifth radar module 118 is operably coupled to a sixth radar module 122 via a fifth optical fibre 124, the sixth radar module 122 also being operably coupled to the first radar module 104 via a sixth optical fibre 126. For the avoidance of doubt, the fourth, fifth and sixth radar modules 114, 118, 122 are disposed towards the rear end of the vehicle 100.

In this example, the first, second, third, fourth, fifth and sixth radar modules 104, 106, 110, 114, 118, 122 are arranged in a daisy-chain configuration and interconnected by the first, second, third, fourth, fifth, and sixth optical fibres 108, 112, 116, 120, 124, 126. Other network configurations are possible, for example a star configuration, details of which will be described later herein in relation to another embodiment.

The first, second, third, fourth, fifth and sixth radar modules 104, 106, 110, 114, 118, 122 are any suitable automotive radar module, for example model ARS410 available from Continental AG or model LRR4 available from Robert Bosch GmbH adapted to support interconnection by optical fibre.

Turning to FIG. 2, the third radar module 110 is, in this example, responsible for generating a digital clock signal that it communicated to the other radar modules, i.e. the first, second, fourth, fifth and sixth radar modules 104, 106, 114, 118, 122. However, the skilled person should appreciate that this is an arbitrary choice and any of the other radar modules can be selected to be the source of the digital clock signal.

In this example, the radar system 102 is an active radar system and so each radar module is a radar module. The first, second, fourth, fifth and sixth radar modules 104, 106, 114, 118, 122 comprise the same radar capabilities. The third radar module 110 has additional functionality in order to generate a clock signal. As such, for the same of conciseness of description, the radar elements of the radar modules will now be described with reference to the third radar module 110, but the skilled person should appreciate that the other radar modules 104, 106, 114, 118, 122 are configured in a like manner, albeit where differences are indicated.

The third radar module 110 comprises a radar front end unit 200, the radar front end unit 200 comprising a transmit module 202 and a receive module 204 that are both driven by a shared local oscillator clock signal 206. The transmit module 202 comprises, inter alia, power amplifiers 208, a Voltage Controlled Oscillator (VCO) and Phase Locked Loop (PLL) 210, constituting a digital clock signal generator, a controller 212 and one or more transmit antenna (not shown) arranged to generate, when in use, a radar illumination signal. In this example, the controller 212 is provided to, inter alia, control the VCO and PLL 210, such as controlling the frequency modulation (increasing/decreasing the frequency during a chirp), controlling the shape of chirps, and/or the number of chirps generated within a frame. Other, more advanced, functionalities are also supported in some examples, for example controlling phase shifting. In addition, the power of the power amplifiers 208 can be controlled by the controller 212. As these structural components are well known in relation to radar modules and not core to an understanding of the embodiments described herein, for the sake of clarity and conciseness of description, these structural components will not be described in further detail.

The receive module 204 comprises one or more receive antennas (not shown), mixers 214, amplifiers 216, a baseband processing unit 218 and another controller 220. Again, as these structural components are well known in relation to radar modules and not core to an understanding of the embodiments described herein, for the sake of clarity and conciseness of description, these structural components will not be described in further detail. The receive module 204 is operably coupled to an Analogue-to-Digital Converter module 222, which is operably coupled to a radar processing module 224.

In contrast with the third radar module 110, the first, second, fourth, fifth and sixth radar modules 104, 106, 114, 118, 122 do not possess the VCO PLL 210, the controller 212, and the another controller 220, because clock data is to be obtained from the third radar module 110. To enable receipt of the digital clock signal, the first, second, fourth, fifth and sixth radar modules 104, 106, 114, 118, 122 comprise a receive electro-optic interface device 226 having an optical domain side and an electrical domain side. Furthermore, the controller 220 cooperates with other circuitry (not shown) of the radar front end unit 200 to provide digital clock signal receiver functionality. The receive electro-optic interface device 226 is any suitable optoelectronic module capable of converting signals received in the optical domain into signals in the electrical domain. As such devices are commonplace, for the sake of clarity and conciseness of description, the receive electro-optic interface device 226 will not be described in further detail herein. In this example, the receive electro-optic interface device 226 is operably coupled to a respective optical fibre to which a given radar module is connected, which can require the employment of splicing and/or pass-through connection techniques.

In order to distribute the digital clock signal, in this example, the third radar module 110 is assigned master status. The third radar module 110 comprises a transmit electro-optic interface device 228 having an optical domain side and an electrical domain side, which is arranged to receive, in this example, an ADC clock signal generated by the VCO PLL 210, and to convert the digital clock signal from the electrical domain into the optical domain for propagation to the first, second, fourth, fifth and sixth radar modules 104, 106, 114, 118, 122 via the first, second, third, fourth, fifth and sixth optical fibres 108, 112, 116, 120, 124, 126.

Figure 3:
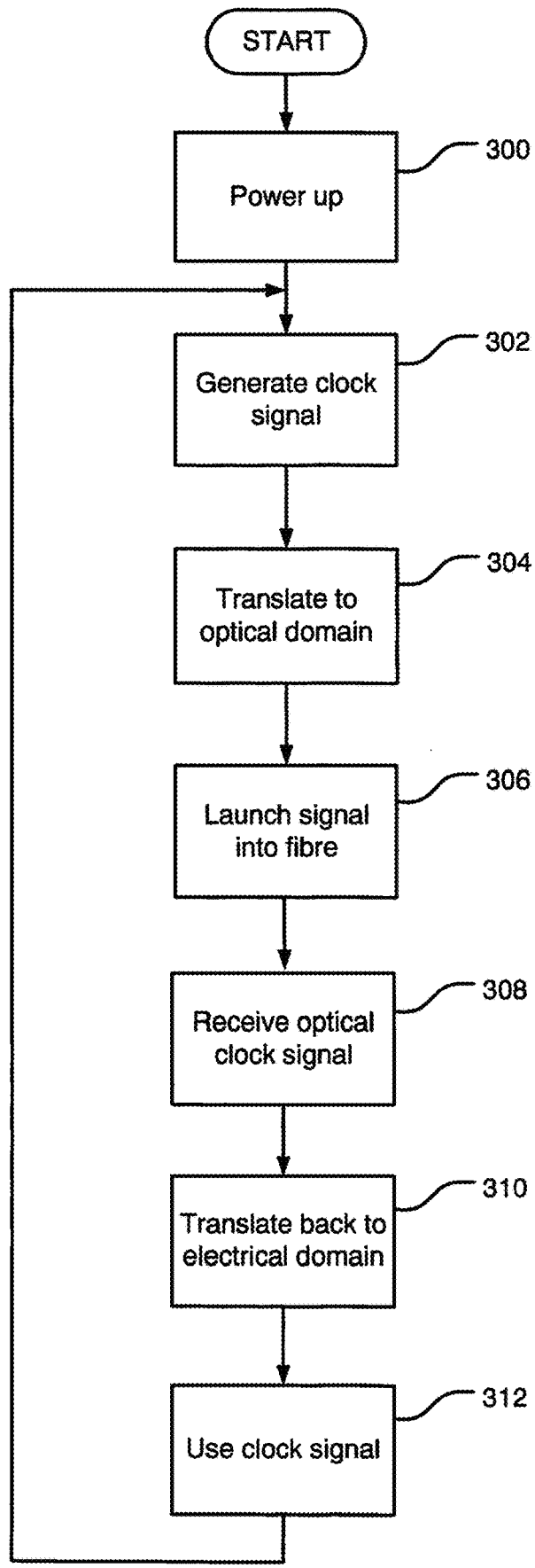
FIG. 3 is a flow diagram of a method of synchronising the automotive radar system of FIG. 2 constituting another embodiment of the invention.

In operation (FIG. 3), the first, second, third, fourth, fifth and sixth radar modules 104, 106, 110, 114, 118, 122 are powered up (Step 300) and an ADC clock signal is generated (Step 302) by the third radar module 110. The ADC clock signal and an associated trigger signal, in the electrical domain, are received by the transmit electro-optic interface device 228 and converted (Step 304) to the optical domain, the digital optical clock signal and the associated trigger signal being launched (Step 306) into the second optical fibre 112 coupled to the transmit electro-optic interface device 228 for propagation to the other radar modules 104, 106, 114, 118, 122 via the first, second, third, fourth, fifth and sixth optical fibres 108, 112, 116, 120, 124, 126.

The first, second, fourth, fifth and sixth radar modules 104, 106, 114, 118, 122 receive (Step 308) the ADC clock signal and the associated trigger signal at their respective receive electro-optic interface device 226 and the received ADC clock signal and the associated trigger signal are converted (Step 310) from the optical domain to the electrical domain and used (Step 312) by the first, second, fourth, fifth and sixth radar modules 104, 106, 114, 118, 122. This enables the radar modules to maintain synchronisation and so use the illumination generated by other radar modules in the radar system 102 in order provide imaging with improved resolution.

Figure 4:
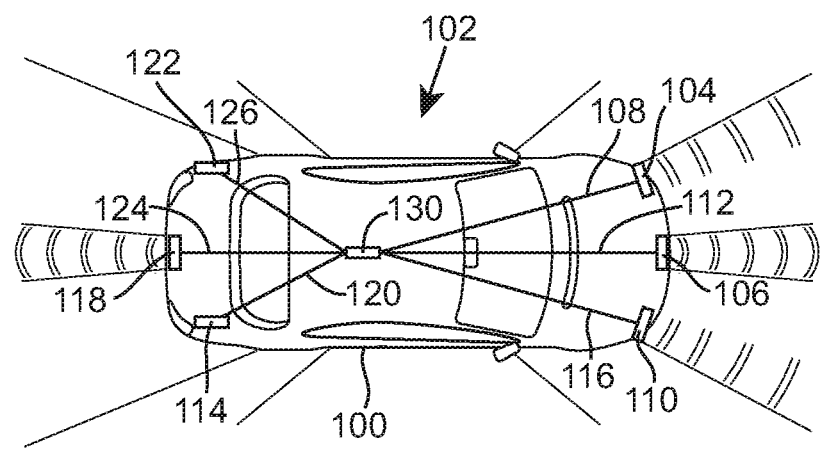
FIG. 4 is a schematic diagram of a vehicle comprising another automotive radar system constituting yet another embodiment of the invention.

Referring to FIG. 4, in a simplified example of another embodiment, the vehicle 100 comprises the automotive radar system 102. However, in this example, the radar system 102 is configured as a star network and comprises a central unit 130 operably coupled to the first, second, third, fourth, fifth and sixth radar modules 104, 106, 110, 114, 118, 122 via the first, second, third, fourth, fifth and sixth optical fibres 108, 112, 116, 120, 124, 126, respectively.

In this example, the first, second, fourth, fifth and sixth radar modules 104, 106, 114, 118, 122 have the same architecture as described above in relation to the previous embodiment. Additionally, the third radar module 110 also possesses the same architecture as the first, second, fourth, fifth and sixth radar modules 104, 106, 114, 118, 122.

Figure 5:
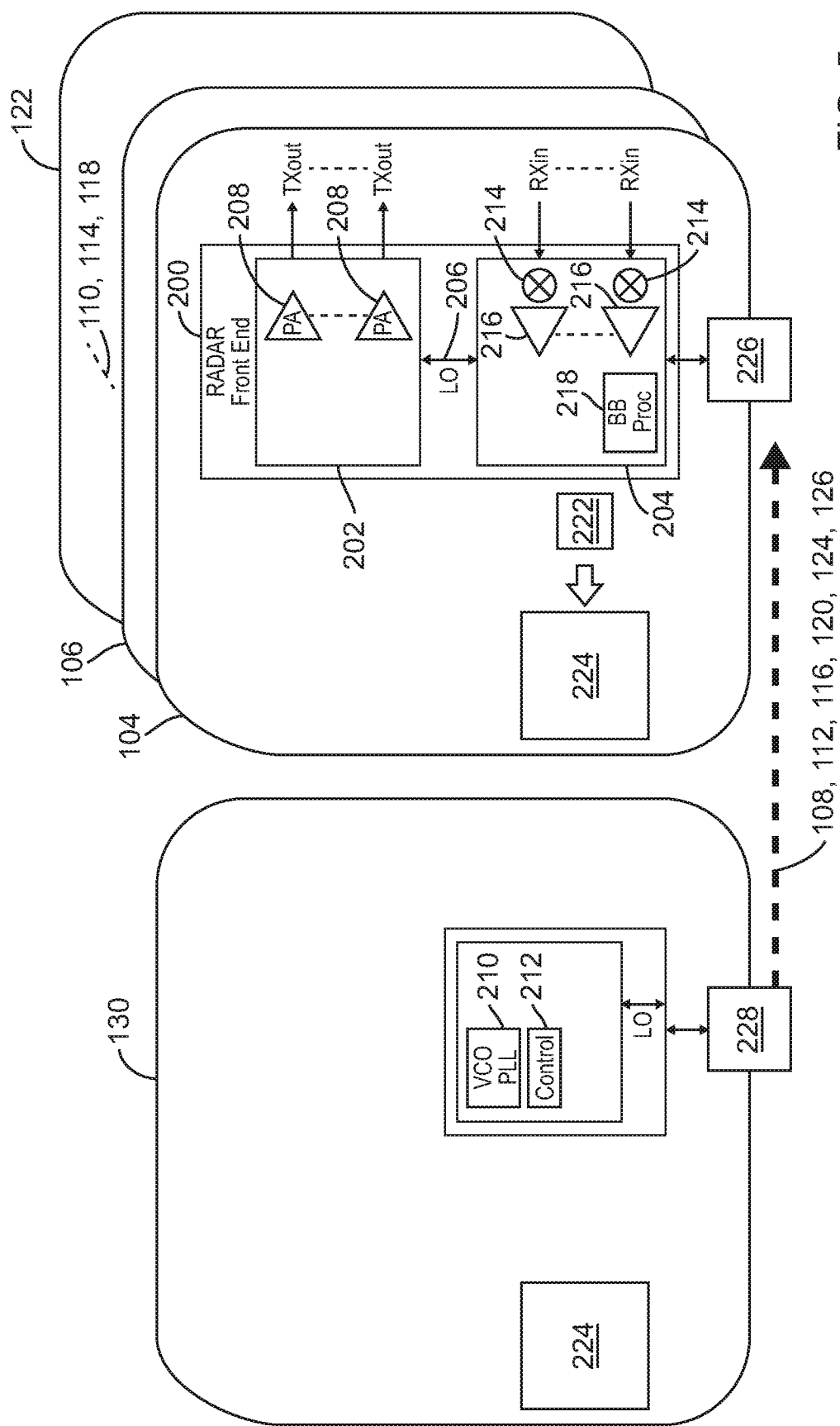
FIG. 5 is a schematic diagram of the radar system of FIG. 4 in greater detail.

Turning to FIG. 5, the central unit 130 comprises the Voltage Controlled Oscillator (VCO) and Phase Locked Loop (PLL) 210 and the controller 212 previously possessed by the third radar module 110. The VCO PLL 210 generates the digital clock signal used by the ADCs of the first, second, third, fourth, fifth and sixth radar modules 104, 106, 110, 114, 118, 122. In order to be able to distribute the digital clock signal optically, the central unit 130 comprises the transmit electro-optic interface device 228, which is arranged to receive, in this example, the digital clock signal generated by the VCO PLL 210, and to convert the digital clock signal from the electrical domain into the optical domain. The central unit 130 also comprises the radar processing module 224 described above in relation to the first, second, third, fourth, fifth and sixth radar modules 104, 106, 110, 114, 118, 122.

Figure 6:
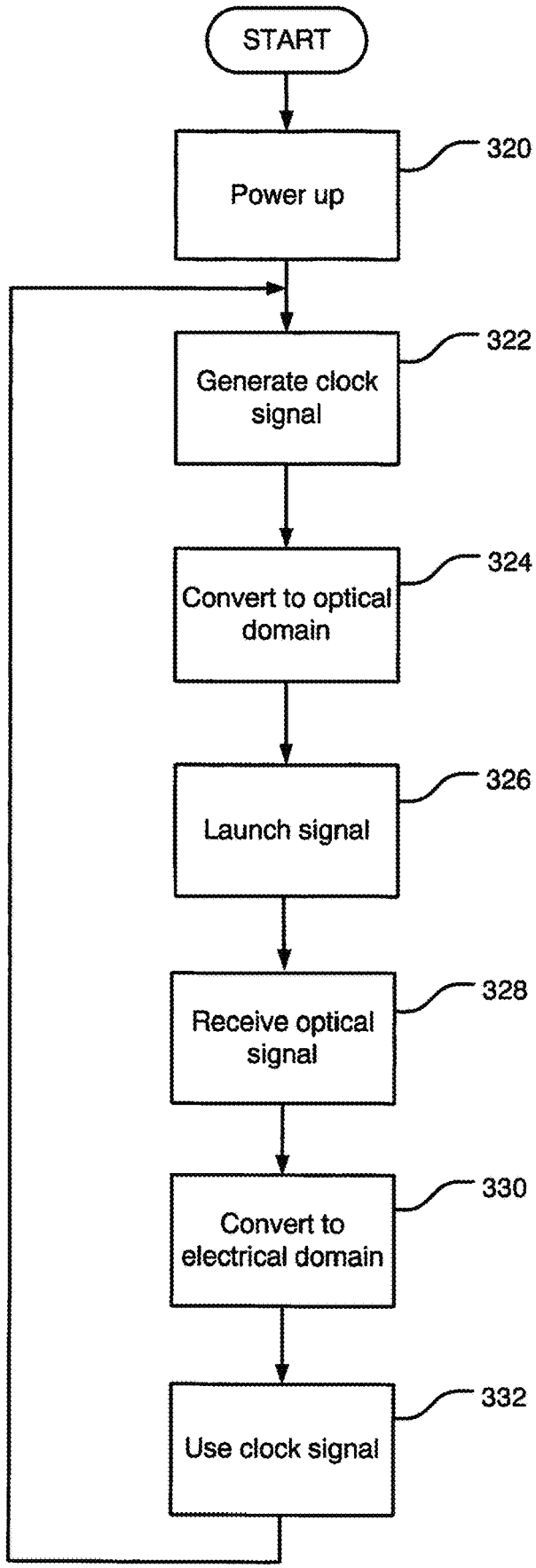
FIG. 6 is a flow diagram of a method of synchronising the automotive radar system of FIG. 5 constituting a further embodiment of the invention.

In operation (FIG. 6), the central unit 130 and the first, second, third, fourth, fifth and sixth radar modules 104, 106, 110, 114, 118, 122 are powered up (Step 320) and an ADC clock signal and the associated trigger signal are generated (Step 322) by the VCO and PLL 210 of the central unit 130. The ADC clock signal and the associated trigger signal, in the electrical domain, are received by the transmit electro-optic interface device 228 and converted (Step 324) to the optical domain, the digital optical clock signal and the associated trigger signal being launched (Step 326) into the first, second, third, fourth, fifth and sixth optical fibres 108, 112, 116, 120, 124, 126 coupled to the transmit electro-optic interface device 228 for propagation to the first, second, third, fourth, fifth and sixth radar modules 104, 106, 110, 114, 118, 122.

The first, second, third fourth, fifth and sixth radar modules 104, 106, 110, 114, 118, 122 receive (Step 328) the ADC clock signal and the associated trigger signal at their respective receive electro-optic interface device 226 and the received ADC clock signal and the associated trigger signal are converted (Step 330) from the optical domain to the electrical domain and used by the first, second, third fourth, fifth and sixth radar modules 104, 106, 110, 114, 118, 122. This enables the radar modules to use (Step 332) the illumination generated by other radar modules in the radar system 102 in order provide imaging with improved resolution.

Figure 7:
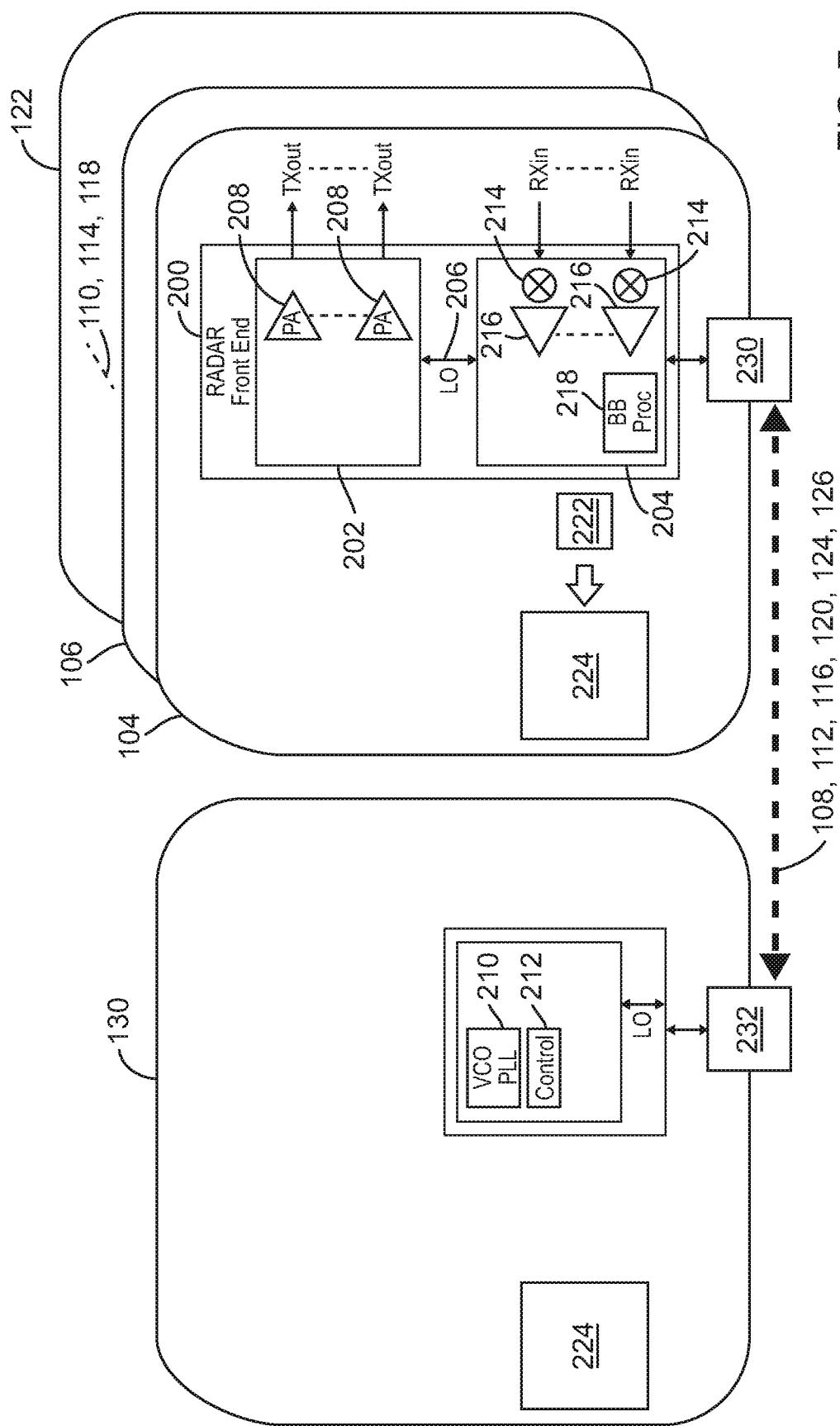
FIG. 7 is a schematic diagram of another radar system for the vehicle of FIG. 4 and constituting another embodiment of the invention.

Turning to FIG. 7, the radar system 102 of the previous embodiment is employed albeit in modified form. In this regard, instead of comprising the receive electro-optic interface device 226, the first, second, third fourth, fifth and sixth radar modules 104, 106, 110, 114, 118, 122 each comprise a respective first, second, third, fourth, fifth and sixth electro-optic transceiver module 230 in order to be able to both receive and transmit optical signals. Similarly, instead of comprising the transmit electro-optic interface device 228, the central unit 130 employs a seventh electro-optic transceiver module 232 in order to be able to both receive and transmit optical signals. The first, second, third, fourth, fifth and sixth optical fibres 108, 112, 116, 120, 124, 126 are therefore used for bidirectional optical communications.

In operation (FIG. 6), the central unit 130 and the first, second, third, fourth, fifth and sixth radar modules 104, 106, 110, 114, 118, 122 are powered up (Step 320) and an ADC clock signal and the associated trigger signal are generated (Step 322) by the VCO PLL 210 of the central unit 130. The ADC clock signal and the associated trigger signal, in the electrical domain, are received by the transmit electro-optic interface device 228 and converted (Step 324) to the optical domain, the digital optical clock signal and the associated trigger signal being launched (Step 326) into the first, second, third, fourth, fifth and sixth optical fibres 108, 112, 116, 120, 124, 126 coupled to the transmit electro-optic interface device 228 for propagation to the first, second, third, fourth, fifth and sixth radar modules 104, 106, 110, 114, 118, 122.

The first, second, third, fourth, fifth and sixth radar modules 104, 106, 110, 114, 118, 122 receive (Step 328) the ADC clock signal and the associated trigger signal at their respective electro-optic transceiver module 230 and the received ADC clock signal and the associated trigger signal are converted (Step 330) from the optical domain to the electrical domain and used by the first, second, third fourth, fifth and sixth radar modules 104, 106, 110, 114, 118, 122. This enables the radar modules to use (Step 332) the illumination generated by other radar modules in the radar system 102 in order provide imaging with improved resolution.

Figure 8:
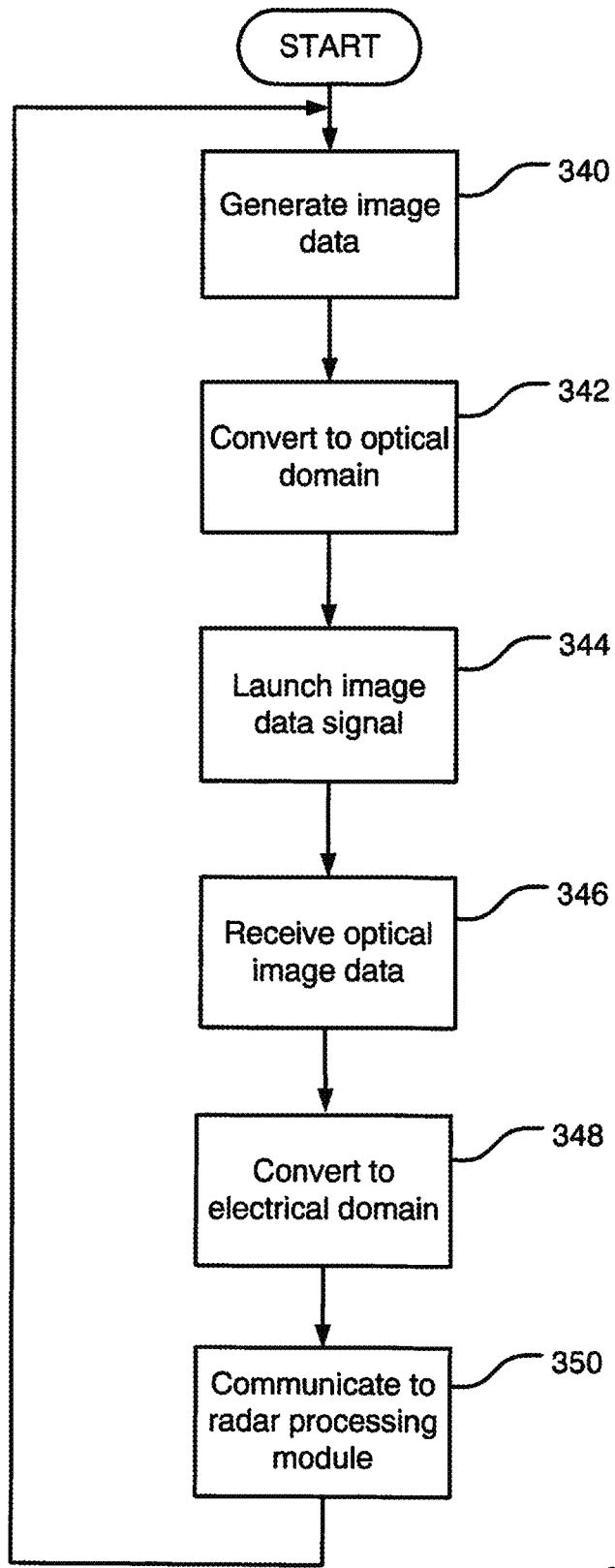
FIG. 8 is a flow diagram of a method of synchronising the automotive radar system of FIG. 7 constituting a further embodiment of the invention.

However, in contrast with the preceding embodiment and referring to FIG. 8, the radar data generated (Step 340) by the first, second, third fourth, fifth and sixth radar modules 104, 106, 110, 114, 118, 122 is respectively communicated back to the central unit 130 via the first, second, third, fourth, fifth and sixth optical fibres 108, 112, 116, 120, 124, 126. In this respect, image data generated by a radar module is communicated in the electrical domain to the respective electro-optic transceiver module 230 of the radar module and the electro-optic transceiver module 230 converts (Step 342) the image data in the electrical domain into the optical domain and launches (Step 344) the optical signal generated into the respective optical fibre to communicate the optical signal back to the central unit 130. Upon receipt (Step 346) of the image data from one or more of the first, second, third fourth, fifth and sixth radar modules 104, 106, 110, 114, 118, 122, the optical signal bearing the image data is converted (Step 348) from the optical domain to the electrical domain by the seventh electro-optic transceiver module 232 and communicated (Step 350) to the radar processing module 224 for further processing, for example object detection and/or object classification. In some embodiments, the radar processing module 224 can be arranged optionally to combine or "fuse" data from different types of sensors employed in relation to the vehicle 100, for example camera data, lidar data and/or ultrasonic data.

In respect of all of the above embodiments, it should be appreciated that the optical fibres 108, 112, 116, 120, 124, 126 can be used to communicate other data, for example local oscillator signal, synchronisation data for radar chirps, such as is employed in FMCW radar, or sequence data for Digital Modulation Radar (DMR). Indeed, in respect of the first embodiment described above, the third radar module 110 is arranged to cooperate with one or more of the other radar modules in order to provide synchronism with respect to illumination signals generated. Similarly, in respect of other embodiments, the central unit 130 is arranged to cooperate with one or more of the other radar modules to provide synchronism with respect to the illumination signals generated. The illumination signal can be a Frequency Modulated Continuous Wave (FMCW) chirp signal, a digital sequence or any other suitable illumination scheme.

A skilled artisan will appreciate that the level of integration of receiver circuits or components may be, in some instances, implementation-dependent. In this respect, the electro-optic interface devices and transceivers can be implemented in a number of different ways depending upon technologies employed and/or desired performance parameters. It should therefore be appreciated that the electro-optic interface and transceiver devices can be of any suitable implementation, depending upon the technical and/or commercial requirements of the automotive radar system 100. It should also be appreciated that although six radar modules are described herein, a greater or smaller number of radar modules can be employed in other examples. Additionally, or alternatively, the radar modules can be located at different positions about the vehicle 100, such location can be arbitrary.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations are merely illustrative. Multiple operations may be combined into a single operation, a single operation may be distributed to additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'embedded systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An automotive radar system comprising:
   a master radar module;
   a first radar module;
   a second radar module;
   an optical waveguide arrangement operably coupling the master radar module to the first and second radar modules, wherein:
   the master radar module comprises an electro-optical interface device having an electrical domain side and an optical domain side, the optical domain side being operably coupled to the optical waveguide arrangement; and
   the master radar module comprises a digital clock signal generator operably coupled to the electrical domain side of the electro-optical interface device, wherein the digital clock signal generator generates, in response to a trigger signal, a digital clock signal and the master radar module synchronizes with the first radar module and the second radar module by communicating, via an optical domain and using the optical waveguide arrangement, the digital clock signal and the trigger signal to the first radar module and from the first radar module to the second radar module.

2. The automotive radar system of claim 1, wherein the digital clock signal generator comprises an analogue-to-digital converter clock signal generator.

3. The automotive radar system of claim 1, wherein the master radar module comprises a local oscillator signal generator operably coupled to the electrical domain side of the electro-optical interface device.

4. The automotive radar system of claim 1, wherein the first radar module comprises a first digital clock signal receiver.

5. The automotive radar system of claim 4, wherein the second radar module comprises a second digital clock signal receiver.

6. The automotive radar system of claim 5, wherein the master radar module is arranged to communicate the digital clock signal to the first radar module in order to maintain synchronism between the master radar module and the first radar module.

7. The automotive radar system of claim 5, wherein the master radar module is arranged to communicate the digital clock signal to the second radar module to maintain synchronism between the master radar module, the first radar module, and the second radar module by communicating the digital clock signal to the second radar module using the first radar module.

8. The automotive radar system of claim 1, wherein the master radar module is arranged to generate an illumination signal.

9. The automotive radar system of claim 8, wherein the master radar module comprises a central unit.

10. The automotive radar system of claim 8, wherein the master radar module is arranged to cooperate with the first radar module to provide synchronism with respect to the illumination signal.

11. The automotive radar system of claim 10, wherein the master radar module is arranged to generate a Frequency Modulated Continuous Wave (FMCW) chirp signal.

12. The automotive radar system of claim 10, wherein the master radar module is arranged to generate the illumination signal as a digitally modulated signal.

13. The automotive radar system of claim 1, wherein the first radar module is arranged to communicate radar data to the master radar module.

14. The automotive radar system of claim 1, wherein the master radar module is a third radar module.

15. A method of synchronising an automotive radar system, the method comprising:
   generating, in response to a trigger signal, an optical digital clock signal using a master radar module of a plurality of radar modules;
   launching the optical digital clock signal into an optical waveguide arrangement operably coupling the master radar module to a first radar module and a second radar module of the plurality of radar modules; and
   synchronizing the master radar module, the first radar module, and the second radar module by communicating the optical digital clock signal and the trigger signal to the first radar module and the second radar module using the first radar module.

16. The method of claim 15, further comprising generating an illumination signal using the master radar module.

17. The method of claim 16, wherein the master radar module is arranged to cooperate with the first radar module to synchronize with respect to the illumination signal.

18. The method of claim 16, wherein the illumination signal is generated as a digitally modulated signal.

19. The method of claim 15, wherein communicating the optical digital clock signal to the first radar module and the second radar module comprises maintaining synchronism between the master radar module, the first radar module, and the second radar module.

20. The method of claim 15, wherein the master radar module is a third radar module.

\* \* \* \* \*